United States Patent
Crumb et al.

(10) Patent No.: US 11,423,480 B2
(45) Date of Patent: Aug. 23, 2022

(54) METHOD AND GUI FOR CREATING OPTIONALITY IN A COMMODITY CONTRACT SETTLEMENT PRICE

(71) Applicant: ABAXX TECHNOLOGIES INC., Toronto (CA)

(72) Inventors: Joshua Crumb, Christ Church (BB); Andrew Fedak, Christ Church (BB); Christopher A. Wiklof, Everett, WA (US)

(73) Assignee: ABAXX TECHNOLOGIES CORP., Christ Church (BB)

( * ) Notice: Subject to any disclaimer, the term of this patent is extended or adjusted under 35 U.S.C. 154(b) by 96 days.

(21) Appl. No.: 16/708,264

(22) Filed: Dec. 9, 2019

(65) Prior Publication Data

US 2020/0184559 A1    Jun. 11, 2020

Related U.S. Application Data

(60) Provisional application No. 62/776,953, filed on Dec. 7, 2018.

(51) Int. Cl.
| | |
|---|---|
| *G06Q 40/04* | (2012.01) |
| *G06Q 30/02* | (2012.01) |
| *G06Q 20/40* | (2012.01) |
| *G06Q 20/36* | (2012.01) |
| *G06Q 20/38* | (2012.01) |
| *H04L 9/06* | (2006.01) |

(52) U.S. Cl.
CPC ............ *G06Q 40/04* (2013.01); *G06Q 20/36* (2013.01); *G06Q 20/389* (2013.01); *G06Q 20/405* (2013.01); *G06Q 30/0278* (2013.01); *H04L 9/0637* (2013.01)

(58) Field of Classification Search
CPC ....... G06Q 40/04; G06Q 20/389; G06Q 20/36
USPC .......................................................... 705/37
See application file for complete search history.

(56) References Cited

U.S. PATENT DOCUMENTS

| | | | |
|---|---|---|---|
| 2020/0184559 A1* | 6/2020 | Crumb | .................... G06Q 20/12 |
| 2020/0184560 A1* | 6/2020 | Crumb | ............... G06Q 30/0641 |
| 2020/0219089 A1* | 7/2020 | Crumb | .................. G06Q 40/04 |

* cited by examiner

*Primary Examiner* — Lindsay M Maguire
(74) *Attorney, Agent, or Firm* — Panitch Schwarze Belisario & Nadel LLP

(57) ABSTRACT

A computer method for creating optionality of price basis in a commodity contract includes establishing a smart contract for a transfer of a commodity using a distributed ledger and graphical user interface (GUI). The smart contract includes a variable price with a provision for a future determination of a price basis. The computer method includes receiving agreement on the smart contract between a seller and a counterparty, receiving a deposit on a total price from the counterparty, transferring at least a portion of the deposit to the seller, and transferring a token representing the smart contract to the counterparty. The computer method includes, at a future date, receiving a selection of the price basis for the smart contract from one of the counterparty or the seller, and notifying the other of the seller or the counterparty of the selected price basis and a resultant settlement price.

21 Claims, 4 Drawing Sheets

METHOD AND GUI FOR CREATING OPTIONALITY IN A COMMODITY CONTRACT SETTLEMENT PRICE

CROSS-REFERENCE TO RELATED APPLICATIONS

The present application claims priority benefit from co-pending U.S. Provisional Patent Application No. 62/776,953, entitled "SYSTEM AND METHOD OF CREATING OPTIONALITY IN A COMMODITY CONTRACT TIMING PERIOD QUOTATION," filed Dec. 7, 2018, which application, to the extent not inconsistent with the disclosure herein, is incorporated herein by reference.

SUMMARY

According to an embodiment, a computer method and graphical user interface (GUI) for creating optionality of a price basis in a commodity contract includes displaying, on an electronic display of a user device, a GUI including an identifier of a commodity contract with a future delivery date. The identifier of the commodity contract may correspond to a smart contract having access thereto saved on a plurality of computer readable memories as a distributed ledger transaction. The plurality of computer readable memories may be disposed in a corresponding plurality of devices operatively coupled by a computer network. The computer method includes displaying, via the GUI, an indication that the smart contract includes a variable price with a provision for a future determination of a price basis. The computer method includes receiving and displaying, via the GUI, an information object indicating that an agreement on the smart contract between a seller and a counterparty was received by a server computer operatively coupled to the user device and a counterparty device via the computer network. The computer method includes receiving and displaying, from the server computer via the GUI, an indicator that a deposit on a total price for the commodity contract from the counterparty via the counterparty device, The computer method includes receiving and displaying, from the server computer via the GUI, information that at least a portion of the deposit was transferred to the seller as an electronic currency transfer from a counterparty wallet into a seller wallet, indicated in a seller wallet address field in the GUI. The computer method includes receiving and displaying, from the server computer via the GUI, information that a token representing the smart contract was transferred to a counterparty wallet. The computer method includes, at a future date, receiving and displaying, from the server computer via the GUI, information that a selection of the price basis for the smart contract was received from one of the counterparty or the seller. The computer method includes receiving and displaying, from the server computer via the GUI, information that the commodity contract was settled by transferring a settlement amount of the electronic currency into the seller wallet or the counterparty wallet.

According to an embodiment, a computer method for creating optionality of price basis in a commodity contract includes establishing a smart contract for a transfer of a commodity. The smart contract includes a variable price with a provision for a future determination of a price basis. The computer method includes receiving agreement on the smart contract between a seller and a counterparty, receiving a deposit on a total price from the counterparty, transferring at least a portion of the deposit to the seller, and transferring a token representing the smart contract to the counterparty. The computer method includes, at a future date, receiving a selection of the price basis for the smart contract from one of the counterparty or the seller, and notifying the other of the seller or the counterparty of the selected price basis and a resultant settlement price.

DETAILED DESCRIPTION

Figure 1:
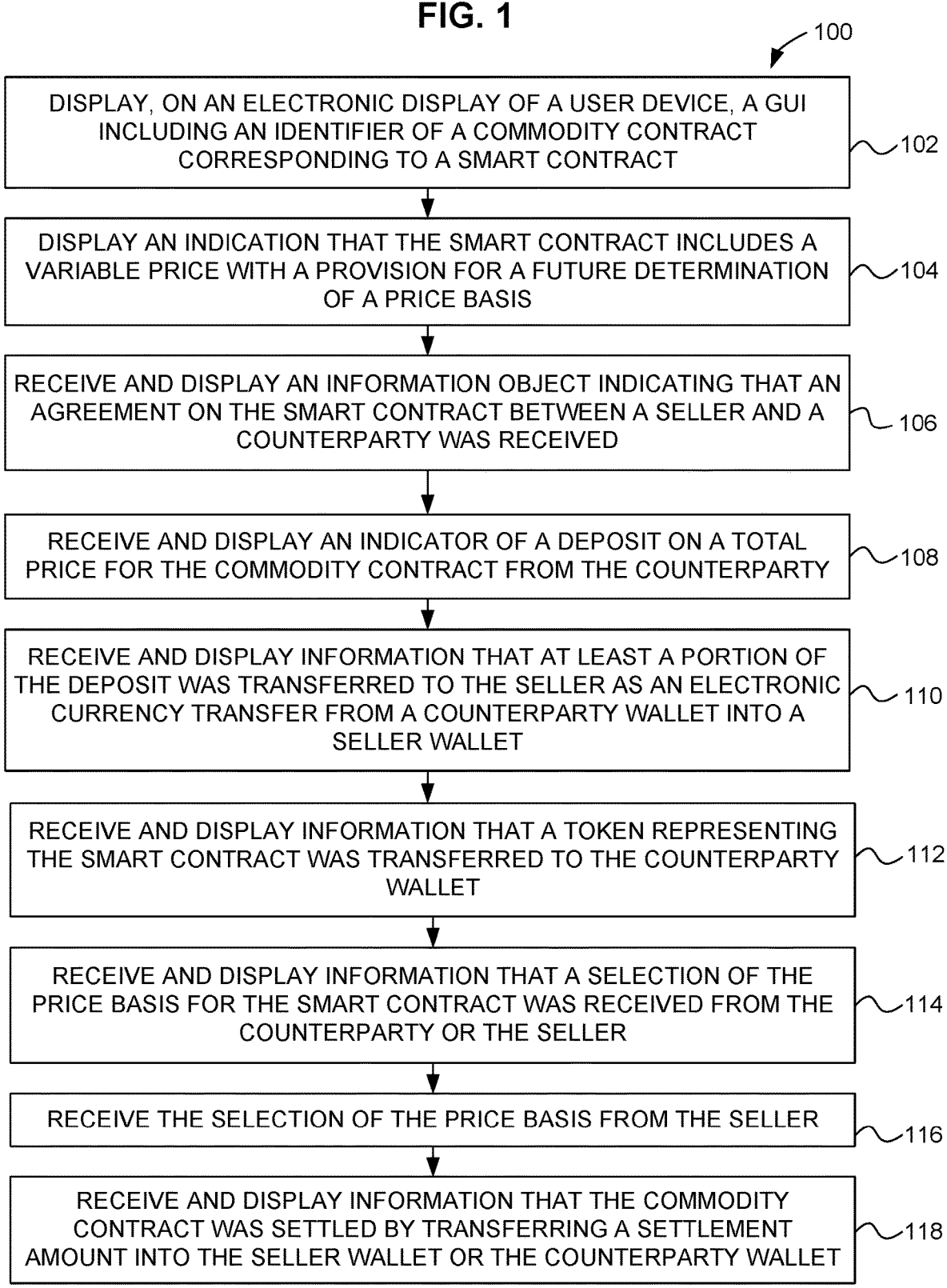
FIG. 1 is a flow chart showing a computer method for creating optionality of a price basis in a commodity contract, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

As used herein, the term "seller" will be understood to be, as indicated by context, interchangeable with "owner", "offering party" or "user". The "seller" will be understood to mean a user with authority to offer a commodity contract for sale, using a smart contract carried by a distributed ledger. The term "buyer" will be understood to be, as indicated by context, interchangeable with "counterparty" or "second user". The "buyer" will be understood to mean a user with authority to purchase the commodity contract from the "seller". The inventors contemplate that commodity contracts may be bought and sold multiple times before delivery to an ultimate user, and thus a user who is a "buyer" in a first transaction offering instance may become a "seller" in a second transaction offering instance.

Figure 2:
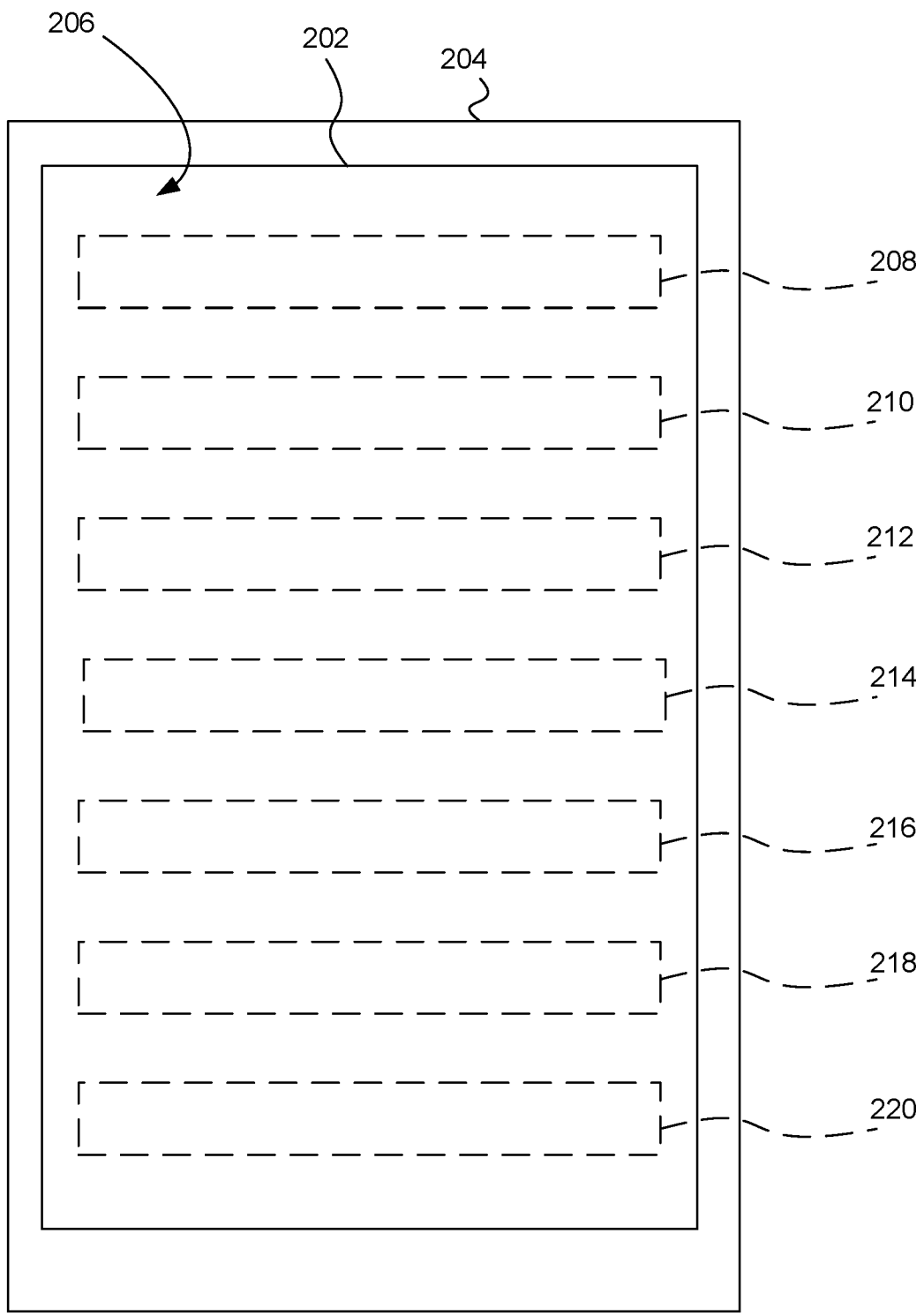
FIG. 2 is a diagram of the graphical user interface (GUI) as described in the computer method of FIG. 1, according to an embodiment.
Figure 4:
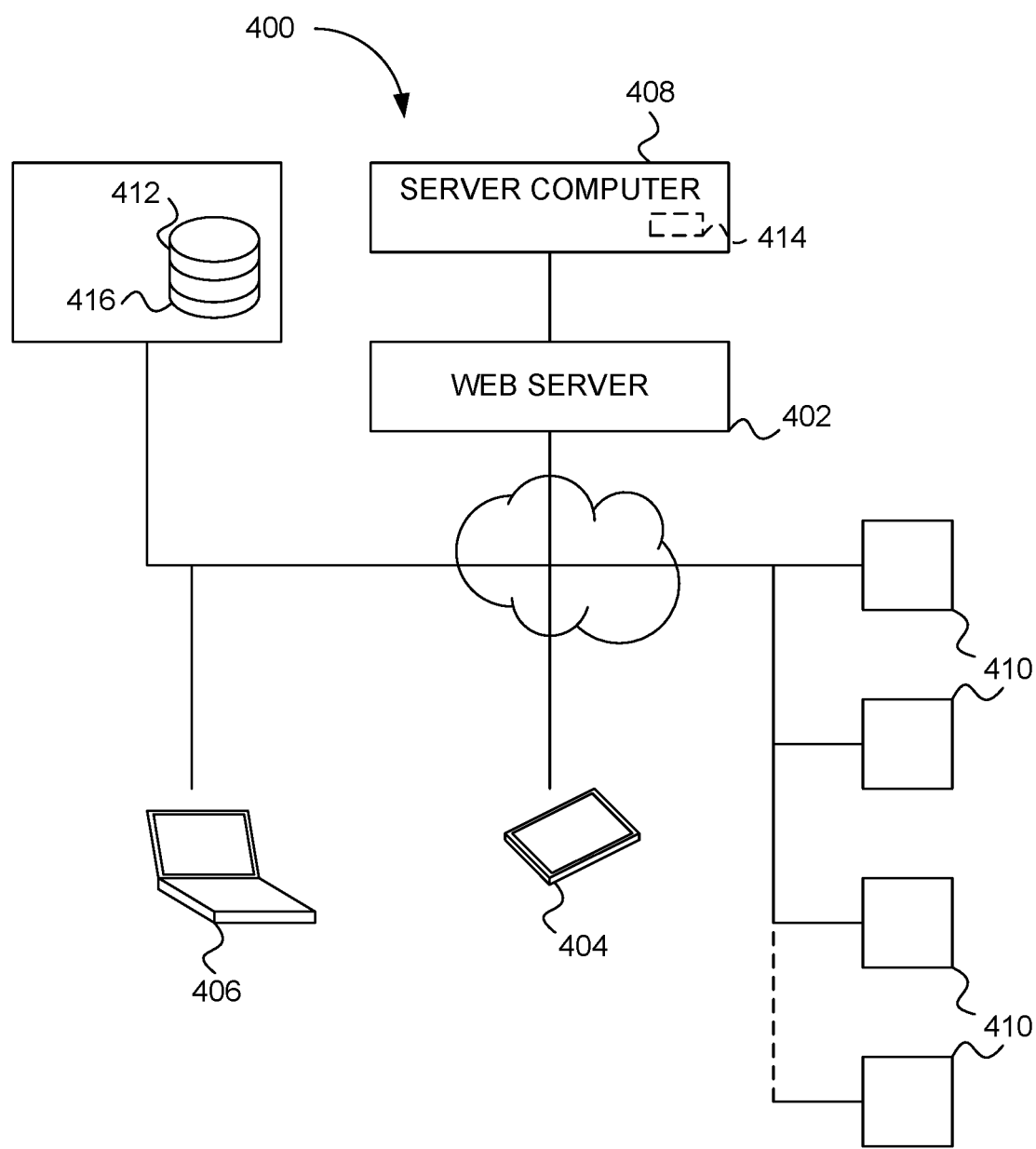
FIG. 4 is a block diagram of a computer system configured to administer a commodity material transaction using a distributed ledger, according to an embodiment.

FIG. 1 is a flow chart showing a computer method 100 for creating optionality of a price basis in a commodity contract, using a graphical user interface (GUI), according to an embodiment. FIG. 2 is a diagram of the GUI 206 described in conjunction with the computer method 100 of FIG. 1, according to an embodiment. FIG. 4 is a block diagram of a computer system 400 configured to administer a commodity material transaction using a distributed ledger, according to an embodiment.

Referring to FIGS. 1, 2, and 4, according to an embodiment, a computer method 100 for creating optionality of a price basis in a commodity contract includes, in step 102, displaying, on an electronic display 202 of a user device 204, 404, a GUI 206 including an identifier 208 of a commodity contract with a future delivery date, the identifier 208 of the commodity contract corresponding to a smart contract having access thereto saved on a plurality of computer readable memories as a distributed ledger transaction, the plurality of computer readable memories being disposed in a corresponding plurality of devices 410 operatively coupled by a computer network. Step 104 includes displaying, via the GUI 206, an indication 414 that the smart contract includes a variable price with a provision for a future determination of a price basis. Step 106 includes receiving and displaying, via the GUI 206, an information object 210 indicating that an agreement on the smart contract between a seller and a counterparty was received by a server computer operatively coupled to the user device 404 and a counterparty device 406 via the computer network. Step 108 includes receiving and displaying, from the server computer via the GUI 206, an indicator 212 that of a deposit on a total price for the commodity contract from the counterparty via the counterparty device 406. Step 110 includes receiving and displaying, from the server computer via the GUI 206, information that at least a portion of the deposit was transferred to the seller as an electronic currency transfer from a counterparty wallet into a seller wallet, indicated in a seller wallet address field 214 in the GUI 206. Step 112 includes receiving and displaying, from the server computer via the GUI 206, information 216 that a token representing the smart contract was transferred to the counterparty wallet. Step 114 includes, at a future date, receiving and displaying, from the server computer via the GUI 206, information 218 that a selection of the price basis for the smart contract was received from one of the counterparty or the seller. Step 118 includes receiving and displaying, from the server computer via the GUI 206, information 220 that the commodity contract was settled by transferring a settlement amount of the electronic currency into the seller wallet or the counterparty wallet.

According to an embodiment, the computer method 100 and GUI 206 further includes, in step 116, receiving the selection of the price basis from the seller.

According to an embodiment, the computer method 100 and GUI 206 further includes receiving an electronic message into the counterparty device 406.

According to one embodiment, the GUI 206 is directly driven by an application on the counterparty device 406 and data corresponding to the GUI 206 is received from the server computer. In another embodiment, the GUI 206 is directly driven by an application on the counterparty device 406 and data corresponding to the GUI 206 is received by reading data from the distributed ledger.

According to an embodiment, the smart contract defines that the seller has the option to select between an average price of the commodity over a selected period of time or a benchmark price for the commodity on a selected day. The smart contract may be a futures contract. In one embodiment, the selected day is a particular day the futures contract matures.

According to an embodiment, receiving and displaying, from the server computer via the GUI 206, the information 218 that the selection of the price basis for the smart contract was received, in step 114, includes receiving and displaying information that the selection of the price basis was made by automatically selecting a highest available price.

According to an embodiment, the smart contract defines a rule by which the price basis is automatically selected at the future date. In one embodiment, the rule defines that the price basis will automatically be selected as an available price basis most favorable to the seller on the future day. In another embodiment, the rule defines that the price basis will automatically be selected as an available price basis most favorable to the counterparty on the future day.

According to an embodiment, if the settlement price is lower than the deposit, the step of receiving and displaying the information 220 that the commodity contract was settled by transferring the settlement amount of the electronic currency into the seller wallet or the counterparty wallet, in step 118, includes receiving and displaying the information 220 that the commodity contract was settled by transferring the settlement amount of the electronic currency from the seller wallet to the counterparty wallet. In another embodiment, if the settlement price is higher than the deposit, the step of receiving and displaying the information 220 that the commodity contract was settled by transferring the settlement amount of the electronic currency into the seller wallet or the counterparty wallet, in step 118, includes receiving and displaying the information 220 that the commodity contract was settled by transferring the settlement amount of the electronic currency from the counterparty wallet to the seller wallet. In one embodiment, the deposit and the settlement price are established in a cryptocurrency. The cryptocurrency may include one or more of Bitcoin, Ethereum, and XRP. In another embodiment, the deposit and the settlement price are established in a fiat currency.

According to an embodiment, the distributed ledger includes a blockchain. The blockchain may include one or more of a public blockchain, a private blockchain, and a permissioned blockchain.

According to an embodiment, the smart contract is added to the distributed ledger as an encrypted transaction. In one embodiment, adding the smart contract to the distributed ledger includes storing the smart contract at one or more cloud locations, encrypting the one or more cloud locations, and entering the encrypted one or more cloud locations onto the distributed ledger as a transaction.

According to an embodiment, the commodity is a physical commodity. In one embodiment, the physical commodity includes one of a refined fuel and an unrefined fuel. The refined fuel or the unrefined fuel may include a fossil fuel. In another embodiment, the physical commodity is an unrefined or a refined mining extract. Additionally and/or alternatively, the physical commodity is a food.

According to an embodiment, receiving the selection of the price basis, in step 116, includes receiving the price basis from the counterparty. In an embodiment, notifying the other of the seller or the counterparty, in step 114, includes notifying the seller of the resultant settlement price. In another embodiment, notifying the seller, in step 114, includes displaying a notification to the seller via the GUI 206 of a computing system. Additionally and/or alternatively, notifying the seller, in step 114, includes sending one or more of an email, a text message, and a multimedia message to the seller. In another embodiment, notifying the seller, in step 114, includes outputting the price basis to an application on a seller device. Additionally and/or alternatively, notifying the seller, in step 114, includes writing the price basis to the smart contract.

According to an embodiment, the counterparty has the option to select between an average price of the commodity over a selected period of time or benchmark price for the commodity on a selected day. In one embodiment, the smart contract is a futures contract. In another embodiment, the selected day is a day the future matures.

According to an embodiment, receiving the selection of the price basis, in step 116, includes automatically selecting a lowest available price.

Figure 3:
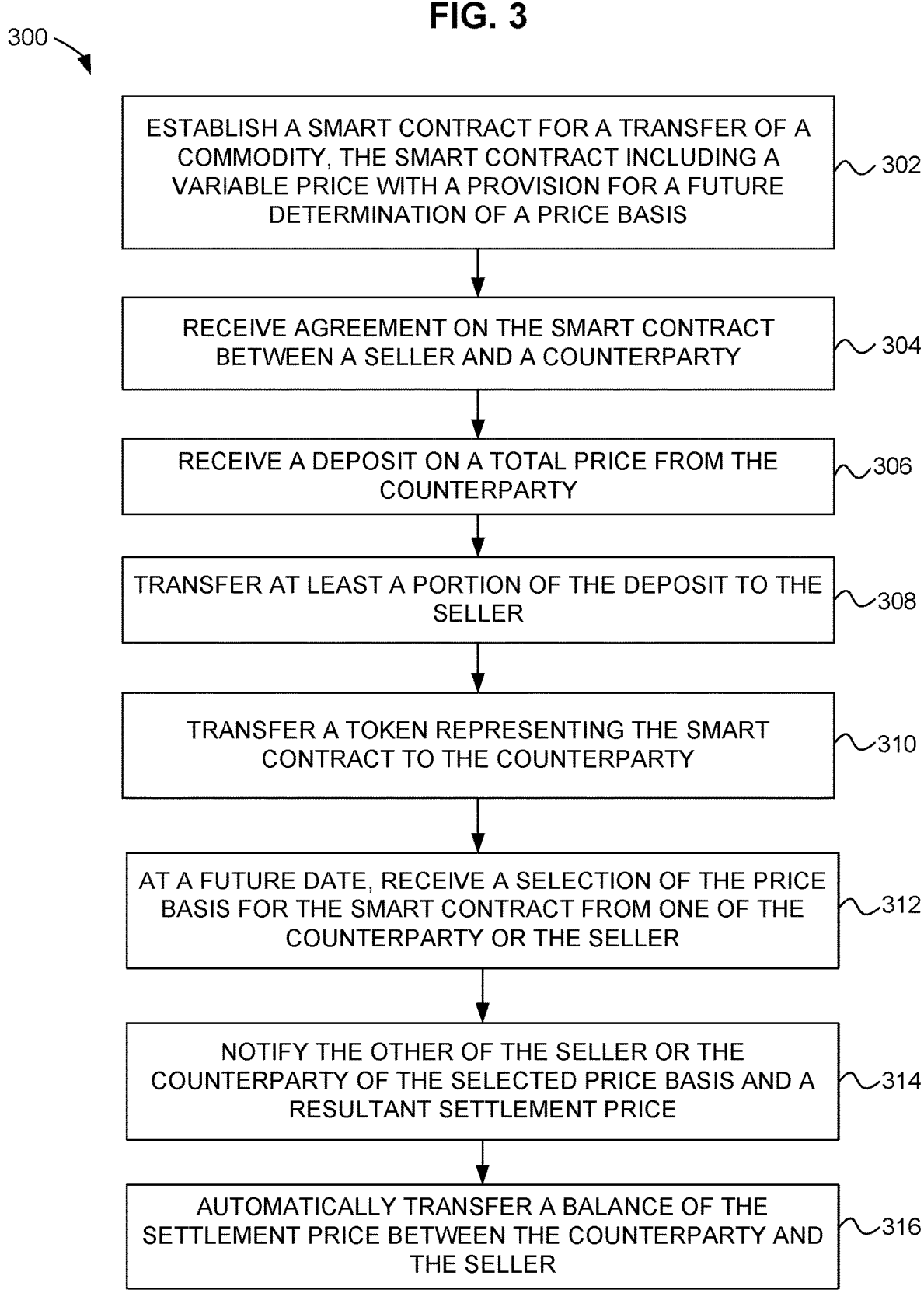
FIG. 3 is a flow chart showing a computer method for creating optionality of a price basis in a commodity contract, according to an embodiment.

FIG. 3 is a flow chart showing a computer method 300 for creating optionality of price basis in a commodity contract, according to an embodiment.

According to an embodiment, the computer method 300 for creating optionality of price basis in a commodity contract includes, in step 302, establishing a smart contract for a transfer of a commodity. In an embodiment, the smart contract includes a variable price with a provision for a future determination of a price basis. The computer method 300 includes, in step 304, receiving agreement on the smart contract between a seller and a counterparty. Step 306 includes receiving a deposit on a total price from the counterparty. Step 308 includes transferring at least a portion of the deposit to the seller. Step 310 includes transferring a token representing the smart contract to the counterparty. Step 312 includes, at a future date, receiving a selection of the price basis for the smart contract from one of the counterparty or the seller. Step 314 includes notifying the other of the seller or the counterparty of the selected price basis and a resultant settlement price.

According to an embodiment, in step 312, receiving the selection of the price basis includes receiving the price basis from the seller.

According to an embodiment, in step 314, notifying the other of the seller or the counterparty includes notifying the counterparty of the resultant settlement price. In one embodiment, in step 314, notifying the counterparty includes displaying a notification to the counterparty via a graphical user interface (GUI) of a computing system. In another embodiment, in step 314, notifying the counterparty includes sending an email to the counterparty. In a further embodiment, in step 314, notifying the counterparty includes sending a text message to the counterparty. Additionally and/or alternatively, in step 314, notifying the counterparty includes sending a multimedia message to the counterparty. In an embodiment, notifying the counterparty includes outputting the price basis to an application on a counterparty device. In another embodiment, notifying the counterparty includes writing the price basis to the smart contract.

According to an embodiment, the seller has the option to select between an average price of the commodity over a selected period of time or benchmark price for the commodity on a selected day. In one embodiment, the smart contract is a futures contract. In an embodiment, the selected day is a day the future matures.

According to an embodiment, in step 312, receiving the selection of the price basis includes automatically selecting a highest available price.

According to an embodiment, the smart contract defines a rule by which the price basis will be automatically selected at the future date. In an embodiment, the rule defines that the price basis will automatically be selected as an available price basis most favorable to the seller on the future day. Additionally and/or alternatively, the rule defines that the price basis will automatically be selected as an available price basis most favorable to the counterparty on the future day.

According to an embodiment, the computer method 300 further includes, in step 316, automatically transferring a balance of the settlement price between the counterparty and the seller. In one embodiment, if the settlement price is lower than the deposit, step 316 includes transferring a difference between the settlement price and the deposit from the seller to the counterparty. Additionally and/or alternatively, if the settlement price is greater than the deposit, step 316 includes transferring the difference between the settlement price and the deposit from the counterparty to the seller.

According to an embodiment, the deposit and the settlement price are established in a cryptocurrency. In one embodiment, the cryptocurrency includes Bitcoin. In another embodiment, the cryptocurrency includes Ethereum. Additionally and/or alternatively, the cryptocurrency includes XRP.

According to an embodiment, the computer method 300 further includes transferring a net settlement value between the counterparty and the seller in the cryptocurrency. In an embodiment, the net settlement value is a difference between the deposit and the settlement price.

According to an embodiment, the deposit and the settlement price are established in a fiat currency. In an embodiment, the computer method 300 further includes transferring a net settlement value between the counterparty and the seller in the fiat currency. In an embodiment, the net settlement value is a difference between the deposit and the settlement price.

According to an embodiment, in step 302, establishing the smart contract for the transfer of the commodity includes establishing the smart contract in a distributed ledger. In an embodiment, the distributed ledger is stored on one or more computer readable media. In another embodiment, the distributed ledger includes a blockchain. In one embodiment, the blockchain includes a public blockchain. In another embodiment, the blockchain includes a private blockchain. Additionally and/or alternatively, the blockchain includes a permissioned blockchain.

According to an embodiment, the smart contract is added to the distributed ledger as a transaction. In an embodiment, adding the smart contract to the distributed ledger comprises encrypting the smart contract. Additionally and/or alternatively, adding the smart contract to the distributed ledger includes storing the smart contract at one or more cloud locations, encrypting the one or more cloud locations, and entering the encrypted one or more cloud locations onto the distributed ledger as a transaction.

According to an embodiment, the commodity is a physical commodity. In an embodiment, the physical commodity includes one of a refined fuel and an unrefined fuel. In one embodiment, the refined fuel or the unrefined fuel includes a fossil fuel. In another embodiment, the physical commodity is an unrefined or a refined mining extract. Additionally and/or alternatively, the physical commodity is a food.

According to an embodiment, in step 312, receiving the selection of the price basis includes receiving the price basis from the counterparty.

According to an embodiment, in step 314, notifying the other of the seller or the counterparty includes notifying the seller of the resultant settlement price. In one embodiment, notifying the seller includes displaying a notification to the seller via a GUI of a computing system. In another embodiment, notifying the seller includes sending an email to the seller. Additionally and/or alternatively, notifying the seller includes sending a text message to the seller. In an embodiment, notifying the seller includes sending a multimedia message to the seller. In another embodiment, notifying the seller includes outputting the price basis to an application on a seller device. In another embodiment, notifying the seller includes writing the price basis to the smart contract.

According to an embodiment, the counterparty has the option to select between an average price of the commodity over a selected period of time or benchmark price for the commodity on a selected day. In an embodiment, the smart contract is a futures contract. In an embodiment, the selected day is a day the future matures.

According to an embodiment, in step 312, receiving the selection of the price basis includes automatically selecting a lowest available price.

FIG. 4 is a block diagram of a computer system 400 configured to administer a commodity material transaction using a distributed ledger, according to an embodiment. As used herein, the term distributed ledger will be understood to include blockchains of various ilks. Illustrated elements described in conjunction with this figure may be described elsewhere herein and may bear dissimilar reference numbers. Corresponding elements will be understood as equivalent as indicated by context.

According to an embodiment, the computer system 400 may include a web server 402 configured to output a first GUI to a first device 404 for a party to receive and display information related to a commodity material transaction smart contract, according to an embodiment. The web server 402 may be further configured to output a second GUI to a second device 406 for a counterparty to receive and display information related to a commodity material transaction smart contract, according to an embodiment. The computer system 400 may include a server computer 408, operatively coupled to the web server 402, and configured to execute data transfer and distributed ledger transactions. The server computer 408 may be further configured to transmit display data to and receive user input from the web server 402, for relay to and from the first and the second devices 404, 406.

According to an embodiment, the computer system 400 may include a plurality of devices 410 operatively coupled to the web server 402 and carrying the distributed ledger. The web server 402 may be configured to transmit the distributed ledger transactions to the plurality of devices 410, according to an embodiment. The plurality of devices 410 may be configured to collectively validate the distributed ledger transactions, according to an embodiment. The web server 402 may be configured to receive and forward collective validation to the server computer 408, according to an embodiment.

According to an embodiment, the server computer 408 may be further configured to transfer a first cryptocurrency and/or digital security associated with commodity transactions corresponding to transactions between a counterparty wallet 412 and a transaction wallet 414 via the web server 402. The server computer 408 may issue a distributed ledger token corresponding to one or more commodity material transactions, according to an embodiment.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for creating optionality of a price basis in a commodity contract using a graphical user interface (GUI), comprising:
    displaying, on an electronic display of a user device, a GUI including an identifier of a commodity contract with a future delivery date, the identifier of the commodity contract corresponding to a smart contract having access thereto saved on a plurality of computer readable memories as a transaction on a distributed ledger, the plurality of computer readable memories being disposed in a corresponding plurality of devices operatively coupled by a computer network, wherein the distributed ledger includes a blockchain;
    displaying, via the GUI, an indication that the smart contract includes a variable price with a provision for a future determination of a price basis;
    receiving and displaying, via the GUI, an information object indicating that an agreement on the smart contract between a seller and a counterparty was received by a server computer operatively coupled to the user device and a counterparty device via the computer network;
    receiving and displaying, from the server computer via the GUI, an indicator of a deposit on a settlement price for the commodity contract from the counterparty via the counterparty device;
    receiving and displaying, from the server computer via the GUI, information that at least a portion of the deposit was transferred to the seller as an electronic currency transfer from a counterparty wallet into a seller wallet, indicated in a seller wallet address field in the GUI;
    receiving and displaying, from the server computer via the GUI, information that a token representing the smart contract was transferred to a counterparty wallet;
    at a future date, receiving and displaying, from the server computer via the GUI, information that a selection of the price basis for the smart contract was received from one of the counterparty or the seller;
    determining the settlement price based on the selected price basis;
    receiving and displaying, from the server computer via the GUI, information that the commodity contract was settled by transferring a settlement amount of the electronic currency into the seller wallet or the counterparty wallet; and
    encrypting the smart contract,
    adding the encrypted smart contract to the distributed ledger as a transaction. wherein the adding of the smart contract to the distributed ledger comprises:
    storing the encrypted smart contract at one or more cloud locations;
    encrypting data identifying the one or more cloud locations; and
    entering the encrypted identifying the one or more cloud locations onto the distributed ledger as a transaction.

2. The computer method for creating optionality of a price basis in a commodity contract using a GUI of claim 1, further comprising receiving, at the server computer, the selection of the price basis from the seller.

3. The computer method for creating optionality of a price basis in a commodity contract using a GUI of claim 2, further comprising:
    notifying the counterparty of the determined settlement price.

4. The computer method for creating optionality of a price basis in a commodity contract using a GUI of claim 3, wherein notifying the counterparty includes outputting the price basis to an application on a counterparty device.

5. The computer method for creating optionality of a price basis in a commodity contract using a GUI of claim 2, wherein the seller has, in selecting the price basis, the option to select between an average price of the commodity over a selected period of time and a benchmark price for the commodity on a selected day.

6. The computer method for creating optionality of a price basis in a commodity contract using a GUI of claim 5, wherein the smart contract is a futures contract.

7. The computer method for creating optionality of a price basis in a commodity contract using a GUI of claim 6, wherein the selected day is a day the futures contract matures.

8. The computer method for creating optionality of a price basis in a commodity contract using a GUI of claim 2, wherein the receiving, at the server computer, of the selection of the price basis includes automatically selecting a highest available settlement price among settlement prices respectively calculated using at least an average price of the commodity over a selected period of time and a benchmark price for the commodity on a selected day.

9. The computer method for creating optionality of a price basis in a commodity contract using a GUI of claim 1, wherein the GUI is directly driven by an application on a seller device, and data corresponding to the GUI is received from the server computer.

10. The computer method for creating optionality of a price basis in a commodity contract using a GUI of claim 1, wherein the GUI is directly driven by an application on a seller device and data corresponding to the GUI is received by reading data from the distributed ledger.

11. The computer method for creating optionality of a price basis in a commodity contract using a GUI of claim 1, wherein the smart contract defines that the seller has, in selecting the price basis, the option to select between an average price of the commodity over a selected period of time or benchmark price for the commodity on a selected day.

12. The computer method for creating optionality of a price basis in a commodity contract using a GUI of claim 11, wherein the smart contract is a futures contract.

13. The computer method for creating optionality of a price basis in a commodity contract using a GUI of claim 12, wherein the selected day is a particular day the futures contract matures.

14. The computer method for creating optionality of a price basis in a commodity contract using a GUI of claim 1, wherein the receiving and displaying, from the server computer via the GUI, of information that a selection of the price basis for the smart contract was received includes receiving and displaying information that the selection of the price basis was made by automatically selecting a highest available price.

15. The computer method for creating optionality of a price basis in a commodity contract using a GUI of claim 1, wherein the smart contract defines a rule by which the price basis is automatically selected at the future date.

16. The computer method for creating optionality of a price basis in a commodity contract using a GUI of claim 15, wherein the rule defines that the price basis will automatically be selected as an available price basis most favorable to the seller on the future day.

17. The computer method for creating optionality of a price basis in a commodity contract using a GUI of claim 15, wherein the rule defines that the price basis will automatically be selected as an available price basis most favorable to the counterparty on the future day.

18. The computer method for creating optionality of a price basis in a commodity contract using a GUI of claim 1, wherein,
   if the settlement price is lower than the deposit, the receiving and displaying of the information that the commodity contract was settled by transferring the settlement amount of the electronic currency into the seller wallet or the counterparty wallet includes receiving and displaying the information that the commodity contract was settled by transferring the settlement amount of the electronic currency from the seller wallet to the counterparty wallet, and
   if the settlement price is higher than the deposit, the receiving and displaying of the information that the commodity contract was settled by transferring the settlement amount of the electronic currency into the seller wallet or the counterparty wallet includes receiving and displaying the information that the commodity contract was settled by transferring the settlement amount of the electronic currency from the counterparty wallet to the seller wallet.

19. The computer method for creating optionality of a price basis in a commodity contract using a GUI of claim 1, wherein the deposit and the settlement price are established in a cryptocurrency.

20. The computer method for creating optionality of a price basis in a commodity contract using a GUI of claim 1, wherein the commodity is a physical commodity.

21. The computer method for creating optionality of a price basis in a commodity contract using a GUI of claim 20, wherein the physical commodity includes a refined or unrefined fuel, a refined or unrefined mining extract, or a food.

* * * * *